US008680869B2

(12) United States Patent
Jiang et al.

(10) Patent No.: US 8,680,869 B2

(45) Date of Patent: Mar. 25, 2014

(54) AC CHARGING CONTACT MECHANISM

(75) Inventors: Hongjun Jiang, Waterloo (CA); Jefferson Elliot Hea, Waterloo (CA); Mohammad Sepahi, Waterloo (CA); Jun Ni, Waterloo (CA)

(73) Assignee: Blackberry Limited, Waterloo, Ontario (CA)

(*) Notice: Subject to any disclaimer, the term of this patent is extended or adjusted under 35 U.S.C. 154(b) by 1074 days.

(21) Appl. No.: 12/706,328

(22) Filed: Feb. 16, 2010

(65) Prior Publication Data

US 2011/0199092 A1 Aug. 18, 2011

(51) Int. Cl.
*G01N 27/416* (2006.01)

(52) U.S. Cl.
USPC .......................................... 324/437; 320/115

(58) Field of Classification Search
USPC .......................................... 320/115; 324/437
See application file for complete search history.

(56) References Cited

U.S. PATENT DOCUMENTS

| | | | | |
|---|---|---|---|---|
| 5,448,765 | A | 9/1995 | Kovanen et al. | |
| 7,165,003 | B2 | 1/2007 | Mok | |
| 7,245,119 | B2 | 7/2007 | Ivannikov et al. | |
| 7,500,161 | B2 | 3/2009 | Dunsmore et al. | |
| 7,528,596 | B2 | 5/2009 | Ivannikov et al. | |
| 2006/0197535 | A1* | 9/2006 | Ivannikov et al. | 324/426 |
| 2007/0132259 | A1* | 6/2007 | Ivannikov et al. | 294/142 |
| 2009/0146609 | A1* | 6/2009 | Santos | 320/111 |
| 2009/0278297 | A1* | 11/2009 | Wang et al. | 269/212 |

FOREIGN PATENT DOCUMENTS

DE 4313962 C1 9/1994

OTHER PUBLICATIONS

Co-pending U.S. Appl. No. 12/356,710, filed Jan. 21, 2009, entitled “Method and Device for Obtaining Candidate Information”.

Wikipedia, the free encyclopedia, “Subscriber Identity Module”, pp. 1-8, Sep. 18, 2009.

BlackBerry Bold; http://na.blackberry.com/eng/devices/blackberrybold/bold_360.jsp; introduced in May 2008; printed Feb. 10, 2010.

“Series S size 2 .100 Centers” http://www.idinet.com/_FileLibrary/PDF/pg48.pdf, printed Dec. 21, 2009.

Extended European Search Report dated Apr. 26, 2010 issued in respect of European Patent Application No. 10153658.9.

European Search Report dated Jul. 10, 2012 based on EP Application No. 10 153 658.9.

* cited by examiner

*Primary Examiner* — Jermele M Hollington
*Assistant Examiner* — Temilade S Rhodes-Vivour

(57) ABSTRACT

AC charging contact mechanisms are provided to charge facilitate testing of mobile devices that have charging contacts on sides of the device. A pin and spring based mechanism is provided to bias a probe against one of the charging contact. A lever based mechanism is also provided which biases a probe against one of the contacts in response to locking the mobile device in a battery emulator.

23 Claims, 15 Drawing Sheets

AC CHARGING CONTACT MECHANISM

TECHNICAL FIELD

The application relates to an AC (alternating current) charging contact mechanism.

BACKGROUND

Many mobile devices undergo functional testing after manufacturing. One such test is an AC charging test, also referred to as a fast charging test. The AC charging test applies DC current that is converted from AC current to AC charge contacts of a mobile device to test the mobile device's circuits associated with charging a battery installed in the device.

During an AC charging test, the battery of a mobile phone is removed, the mobile phone is typically mounted in a battery emulator which is connected in place of the battery. The battery emulator is in turn mounted on a test fixture. To test AC charging, an AC charge is applied through the text fixture and/or battery emulator to the AC charging contacts on the mobile phone. The battery emulator is used to assess whether application of the AC charge would have resulted in an effective charge of a battery, if one had been present. The battery emulator and test fixture can be used for other tests, such as calling and receiving testing, speaker and microphone testing, light sensor and LED testing, camera and flasher testing, keyboard brightness testing, etc. to name a few specific examples.

To test AC charging on mobile devices with AC charge contacts located at the back of the phone, two brass balls can be used to apply the test AC charge to the AC charge contacts. These brass balls are located on the battery emulator.

BRIEF DESCRIPTION OF THE DRAWINGS

Examples of embodiments will now be described in greater detail with reference to the accompanying drawings, in which.

DETAILED DESCRIPTION

Figure 1:
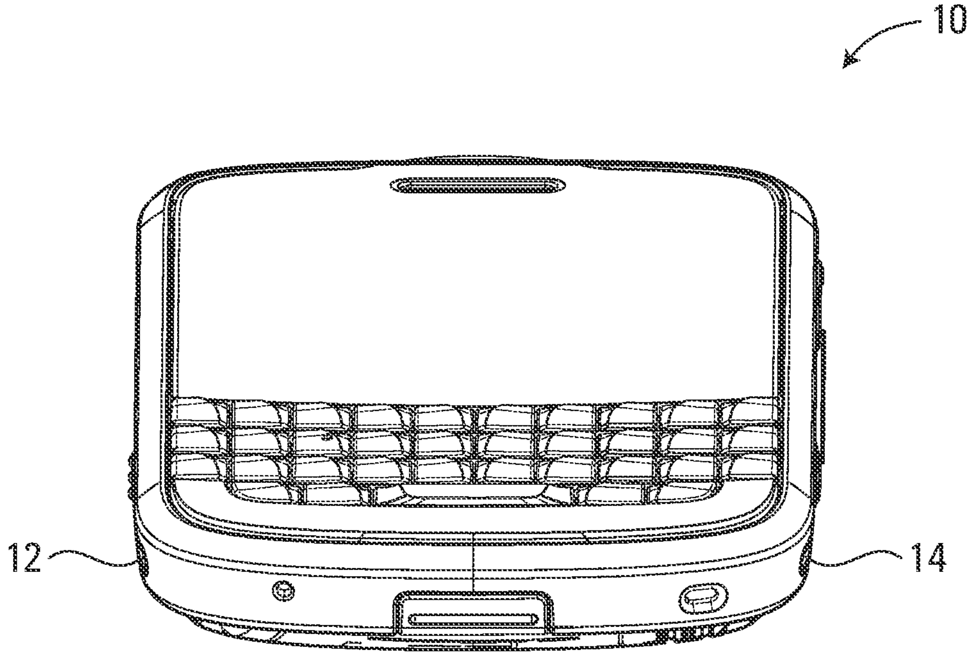
FIG. 1 is a perspective view of a mobile device having AC charge contacts on opposing sides.

Some mobile devices are equipped with AC charging contacts that are located on opposite sides of the device. For AC charging test purposes, the conventional approach of using two brass balls on the battery emulator for the purpose of delivering a test AC charge to the device does not apply to mobile devices having contacts located on opposite sides.

In one aspect, there is provided an AC charging contact mechanism for use with a battery emulator, for testing a device under test having first and second AC charging contacts on opposite sides of the device under test, the device under test having a battery compartment, the AC charging contact mechanism comprising: a first conductive element, the AC charging contact mechanism having a first state in which the first conductive element is positioned to make contact with the first AC charging contact of the device under test, and the AC charging contact mechanism having a second state in which the first conductive element is positioned away from making contact with the first AC charging contact of the device under test; a pin and spring mechanism comprising a pin for holding the AC charging contact mechanism in one of the first state and the second state, and a spring for biasing the AC charging contact mechanism towards the other of the first state and the second state.

In another aspect, there is provided an AC charging contact mechanism for use with a battery emulator, for testing a device under test having first and second AC charging contacts on opposite sides of the device under test, the device under test having a battery compartment, the AC charging contact mechanism comprising: the AC charging contact mechanism connected to or integral with the battery emulator, the AC charging contact mechanism having a first conductive element, the AC charging contact mechanism having a first state in which the first conductive element is positioned to make contact with the first AC charging contact of the device under test, and the AC charging contact mechanism having a first state in which the second conductive element is positioned away from making contact with the first AC charging contact of the device under test; a lever having a pivot point, the lever having a first rotational state about the pivot point when the AC charging contact mechanism in the first state and having a second rotational state about the pivot point when AC charging contact mechanism is in the second state.

In another aspect, there is provided an apparatus for use in testing a device under test having charging contacts on opposite sides of the device, the device having a battery compartment for receiving a battery, the apparatus comprising: a battery emulator having a connector for connection to the battery compartment of the device under test; an AC charging contact mechanism connected to or integral with the battery emulator, the AC charging contact mechanism having a first conductive element, the AC charging contact mechanism having a first state in which the first conductive element is positioned to make contact with the first AC charging contact of the device under test, and the AC charging contact mechanism having a first state in which the second conductive element is positioned away from making contact with the first AC charging contact of the device under test.

In another aspect, there is provided a method comprising: installing a device under test in an apparatus for use in testing a device under test having charging contacts on opposite sides of the device, the device having a battery compartment for receiving a battery, the apparatus comprising: a battery emulator having a connector for connection to the battery compartment of the device under test; an AC charging contact mechanism connected to or integral with the battery emulator, the AC charging contact mechanism having a first conductive element, the AC charging contact mechanism having a first state in which the first conductive element is positioned to make contact with the first AC charging contact of the device under test, and the AC charging contact mechanism having a first state in which the second conductive element is positioned away from making contact with the first AC charging contact of the device under test; performing device testing with the device under test installed in the apparatus.

A mechanism that interconnects a battery emulator and/or test fixture to AC charging contacts located on the opposite sides of a device under test for the purpose of performing an AC charging test for the device is provided. In such mobile devices, one AC charging contact is a ground and the other is a positive contact. FIG. 1 shows an example of a device under test 10 with charging contacts 12 and 14 on opposite sides of the device under test 10. In the illustrated example and the remainder of this description, the device under test is a mobile phone. However, more generally, the mechanism described herein is also applicable to any device under test for which the battery is charged through AC charging contacts located on the sides of the device. Such devices are typically, but not necessarily, mobile devices. Other examples of such devices include, but are not limited to mobile phones, personal digital assistants (PDAs), laptop computers, and Global Positioning System (GPS) receivers.

Figure 2A:
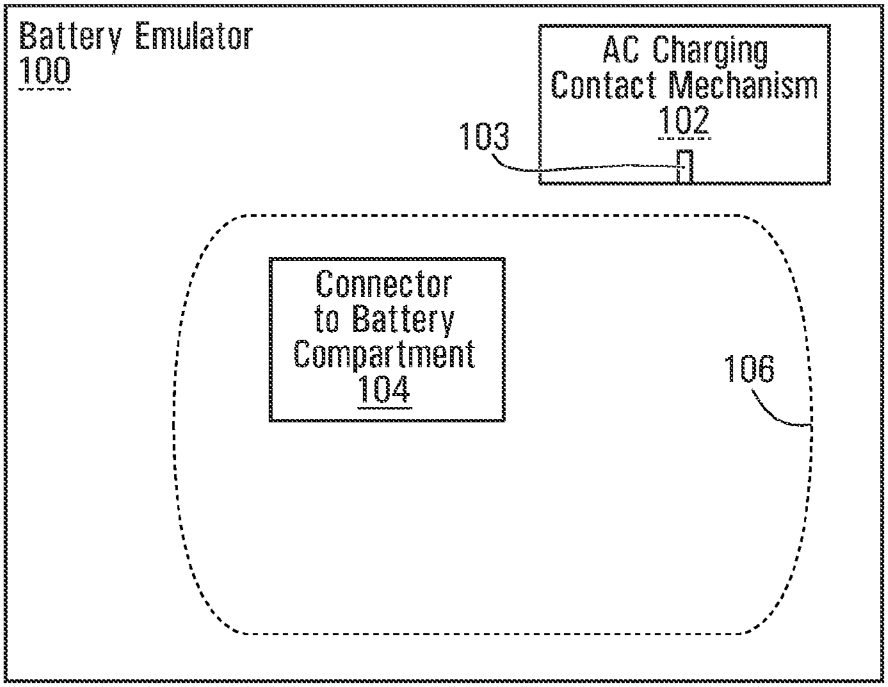
FIG. 2A is a schematic diagram of a battery emulator having an AC charging contact mechanism.

Referring to FIG. 2A, shown is a schematic of a battery emulator generally indicated at 100. No mobile device is installed in the view of FIG. 2A, but dotted line 106 indicates where such a device would be installed. The battery emulator includes a mechanism (not shown) for mechanically holding a mobile device in place; such mechanisms are well known to persons skilled in the art. An AC charging contact mechanism 102 is provided for making contact to an AC charging contact on the side of a mobile device. The AC charging mechanism 102 includes a conducting element 103 shown in a disengaged position. When a mobile device is installed in the battery emulator 100, its battery is removed exposing a battery compartment. A connector to battery compartment 104 is provided for interconnecting the battery emulator 100 to the exposed battery compartment of a mobile device. In some embodiments, the AC charging contact mechanism 102 can be considered to form part of the battery emulator. This could be in the sense it is formed integrally with the battery emulator or is more or less permanently attached to the battery emulator. In some embodiments, the AC contact mechanism 102 is a separate mechanism that can be installed on the battery emulator 100.

Figure 2B:
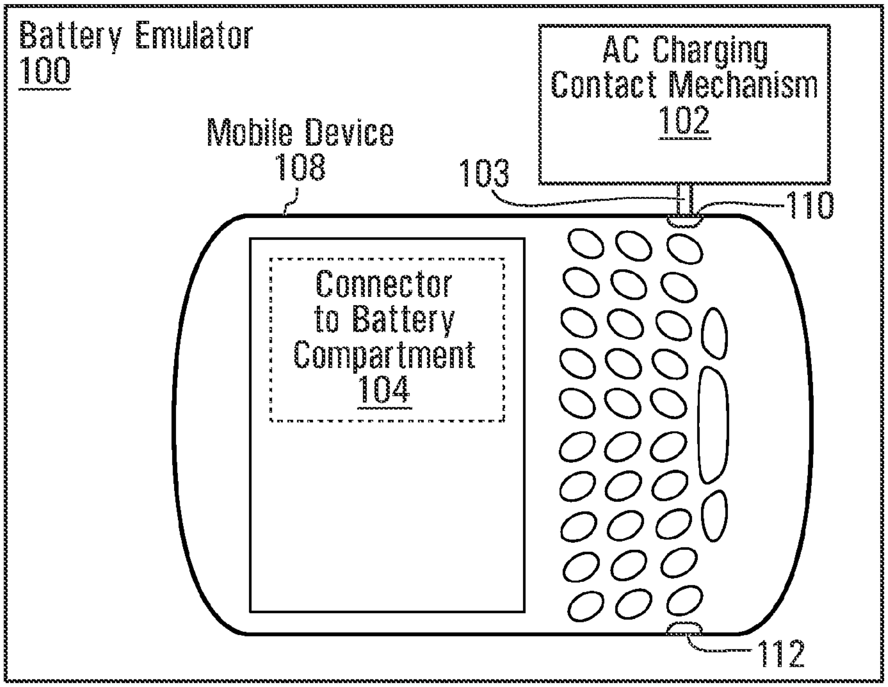
FIG. 2B is a schematic diagram of the battery emulator of FIG. 2A with a mobile phone installed.

Referring now to FIG. 2B, shown is the battery emulator 100 of FIG. 2A, but with a mobile device 108 installed. The connector 104 connects the battery compartment of the mobile device 108 to the battery emulator 100. The mobile device 100 has AC charging contacts 110,112 located on opposite sides of the device. The conducting element 103 of the AC charging contact mechanism 102 has been engaged to make contact with the AC charging contact 110.

Figure 2C:
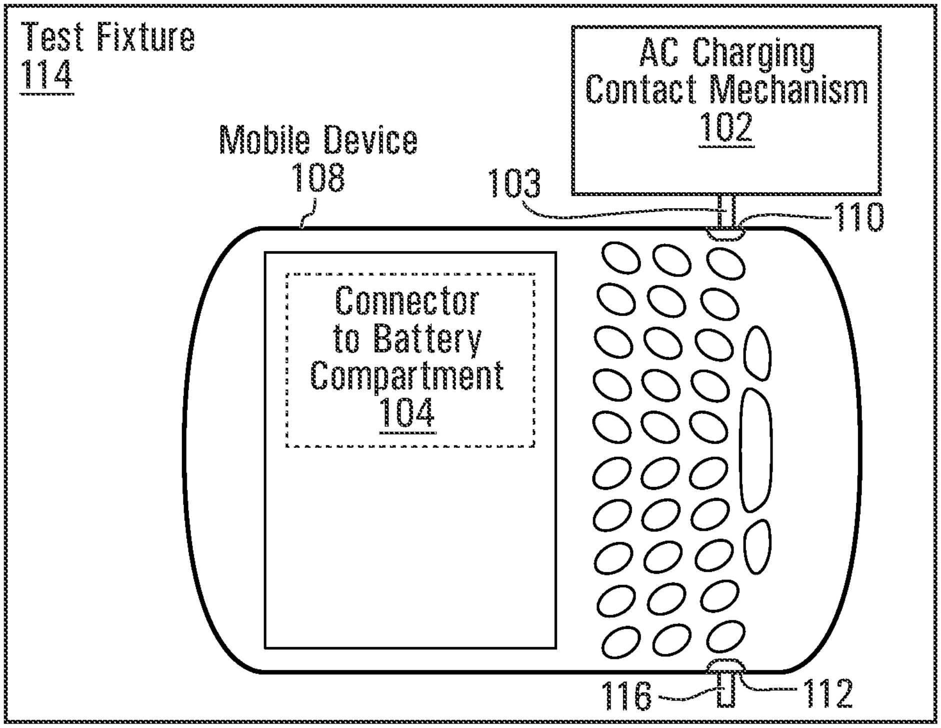
FIG. 2C is a schematic diagram of a test fixture containing the battery emulator and mobile phone of FIG. 2B.

Referring now to FIG. 2C, shown is the battery emulator with mobile device installed of FIG. 2B, installed in a test fixture 114. There is a mechanical mechanism (not shown) for attaching the battery emulator 100 to the test fixture 114. Test fixture 110 has a conducting element 116 that is shown in contact with the other charging contact 112 of the mobile device. Conducting element 116 is positioned such that when a test fixture with mobile device is installed in the test fixture as illustrated, the conducting element 116 makes contact with the charging contact 112 of the mobile device.

In operation, a mobile device 108 is installed in the battery emulator 110. The battery emulator 110 with mobile device 108 is installed in the test fixture 114 such that conducting element 116 makes contact with charging contact 112. Before or after installing the mobile device 108 in the test fixture 114, the AC charging contact mechanism 102 is actuated so as to engage contact between conducting element 103 and charging contact 110 of the mobile device. After installation, various tests can be performed as would be apparent to one skilled in the art, including, but not limited to, an AC charging test.

Figure 3:
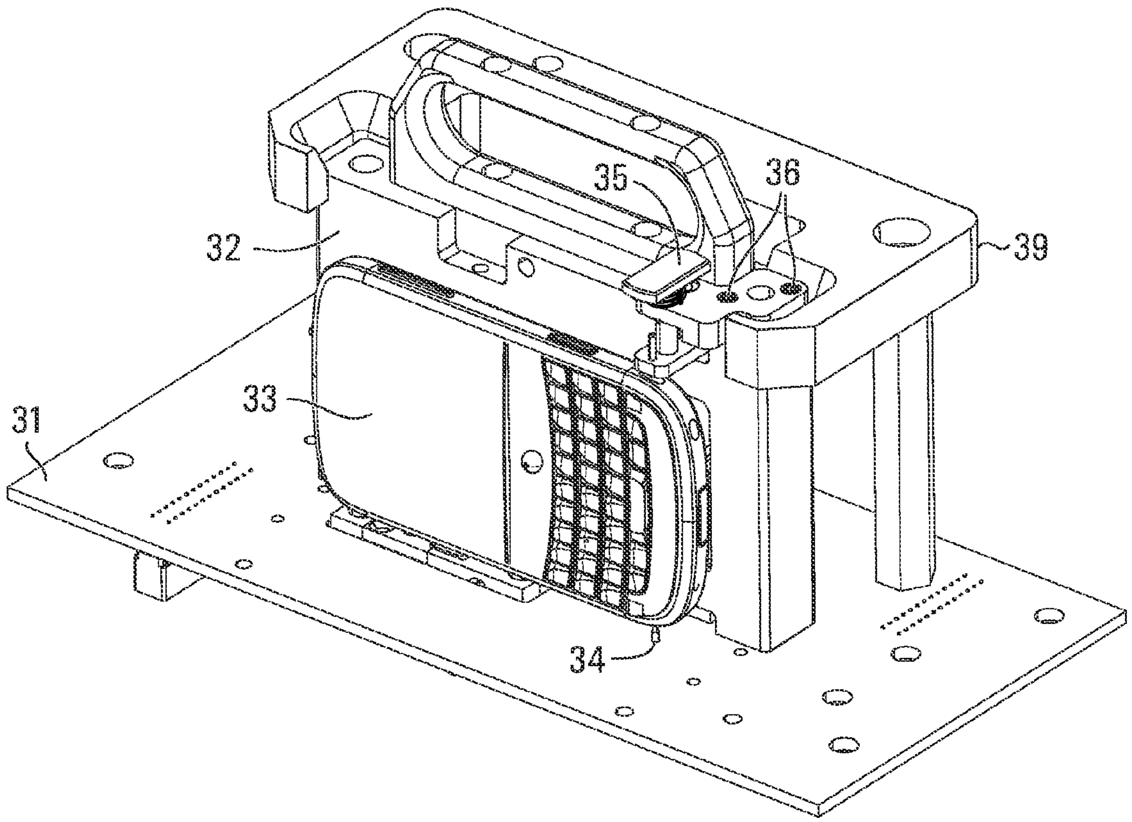
FIG. 3 is a perspective view of a test frame with a battery emulator having an AC charging contact mechanism with a mobile device installed.

An embodiment of an AC charging contact mechanism will now be described with reference to FIGS. 3 to 6B. Referring first to FIG. 3, shown is a mobile device 33, in this case a mobile phone secured on a battery emulator 32, in a test fixture 39 for the purpose of functional tests, including an AC charging test. The battery emulator 32 is removable from the test fixture 39. In some embodiments, the battery emulator 32 is used for transporting the mobile device 33. Power supplies and other signals are routed to the mobile device 33 through electric circuits on the battery emulator 32.

In the illustrated example, a probe 34 is soldered to a platform PCB 31 of the test fixture 39. A probe is typically a socket and a spring loaded tip, usually in round shape and may be coated for conduction purpose. The probe 34 is positioned so as to make contact with an AC charging contact (not shown) on a first side of the mobile device 33 when the mobile device 33 installed in battery emulator 32 is installed in the test fixture 39. In the illustrated example, the probe 34 has a socket and a spring loaded tip. The socket is soldered to the platform PCB 31, and the tip can be compressed in response to an external force and can be recovered when the external force is unloaded. When the mobile device 33 and the battery emulator 32 are inserted and secured in the test fixture 39, the probe 34 is compressed to some extent, providing stable contact with the AC charging contact on the first side of the mobile device 33.

The probe 34 might, for example, be an S2 probe available from IDI, a supplier of probes (sec E cubed Components Inc., Brampton, Ontario, Canada) which has a socket (part # R2SC) and a spring loaded tip (part # S2J4G). More generally, any probe which is conductive and has a structure with socket and spring loaded tip, and has right length may be employed.

Figure 4A:
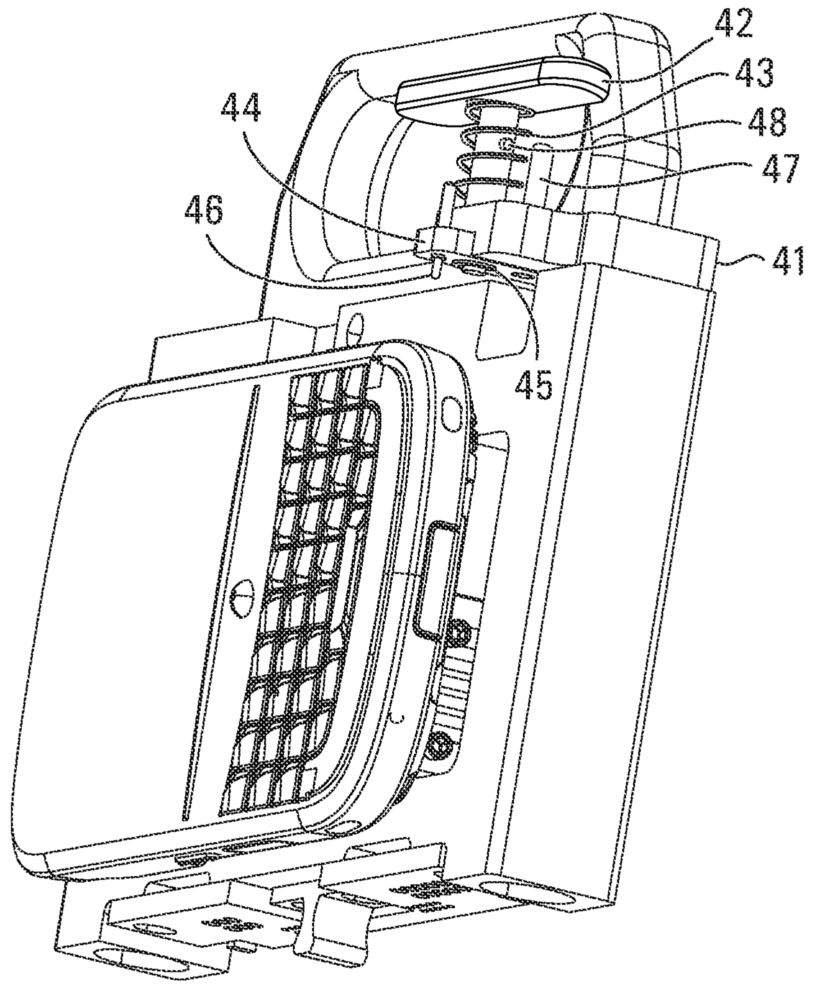
FIG. 4A is a perspective view of a battery emulator having an AC charging contact mechanism.
Figure 4B:
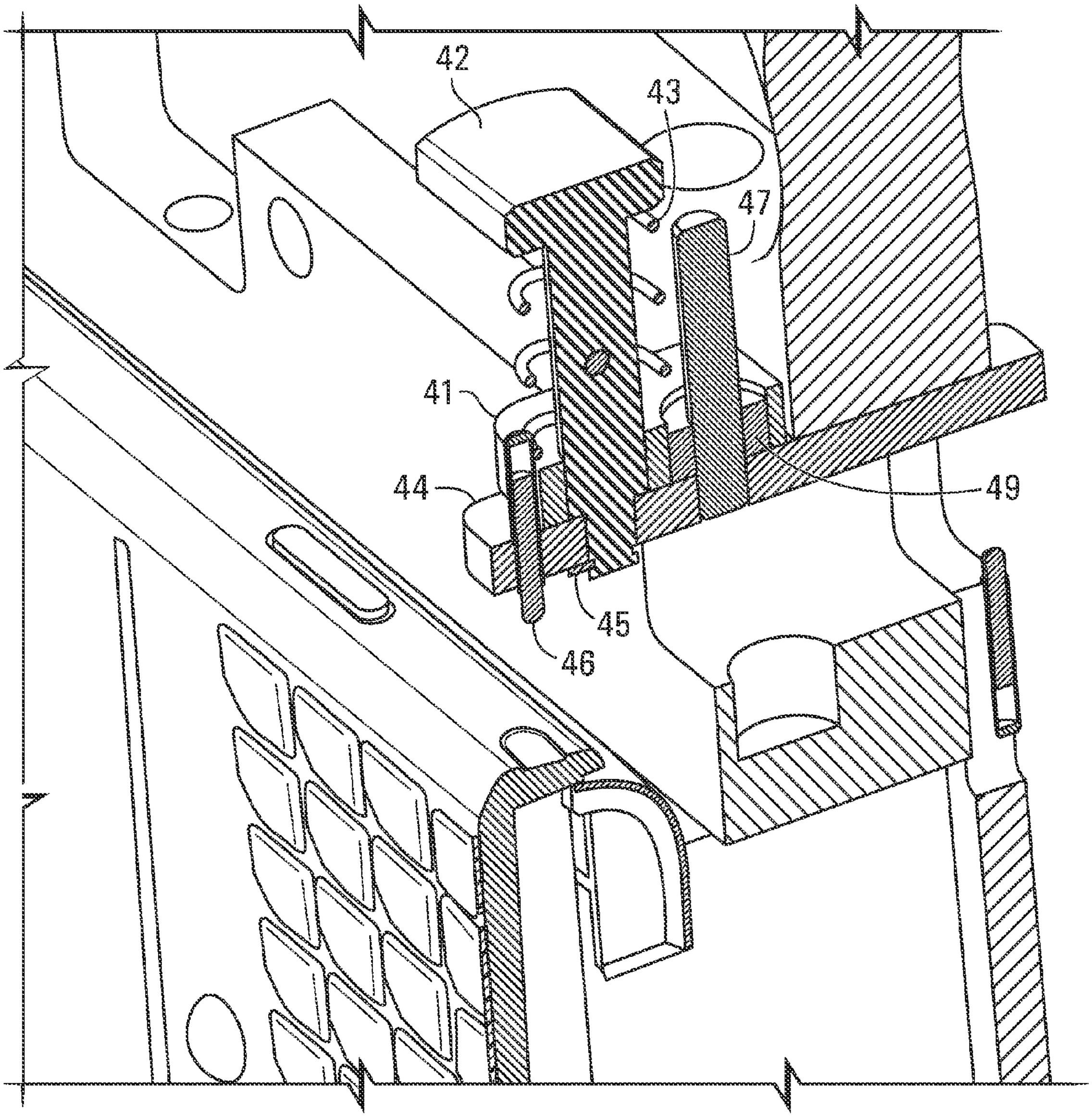
FIG. 4B is a cross-sectional close up view of the AC charging contact mechanism shown in FIG. 4A.

An AC charging contact mechanism 35 is mounted on the battery emulator 32 to make contact with an AC charging contact on a second side of the mobile device 33. As shown in FIGS. 4A and 4B, the AC charging contact mechanism 35 includes a frame block 41, a turning shaft 42, a compression spring 43, a bridge PCB 44, a sleeve bearing 49, a retaining ring 45, a spring loaded probe 46, a guiding pin 47, and a stop pin 48. The probe 46 is attached to the bridge PCB 44 and aligned to contact an AC contact on a side of the mobile phone facing the AC charging contact mechanism 35 when the phone is installed in the battery emulator 32. The turning shaft 42 is moveable within a slot in the frame block 41 in a direction away from and towards the mobile phone, when installed in the battery emulator 32. The compression spring 43 surrounds the turning shaft 42 between a handle on the turning shaft and the frame block 41, and biases the turning shaft 42 away from the mobile phone. The bridge PCB 44 is attached to the turning shaft 42 and thus, moves away from and towards the mobile phone when installed together with the turning shaft. Movement of the bridge PCB 44, in turn, results in the probe 46 moving away from and contacting the AC charge contact on the mobile phone and the side closest the AC charging contact mechanism. The sleeve bearing 49 fits within a fitting hole in the frame block 41 and the guiding pin 47 is attached to the bridge PCB 44 and is moveable through the sleeve bearing 49. The guiding pin 47 provides stability to the bridge PCB 44 when the bridge PCB is moving.

In the illustrated example, the AC charging contact mechanism 35 is a sub-assembly that is mounted on the battery emulator 32 by using two screws, shown as item 36 in FIG. 3. In other embodiments, the frame block 41 can be attached to the battery emulator 32 by welding, using rivets or any suitable means of attaching. Alternatively, it can be integrally formed with one or more other parts of the battery emulator 32.

Figure 5:
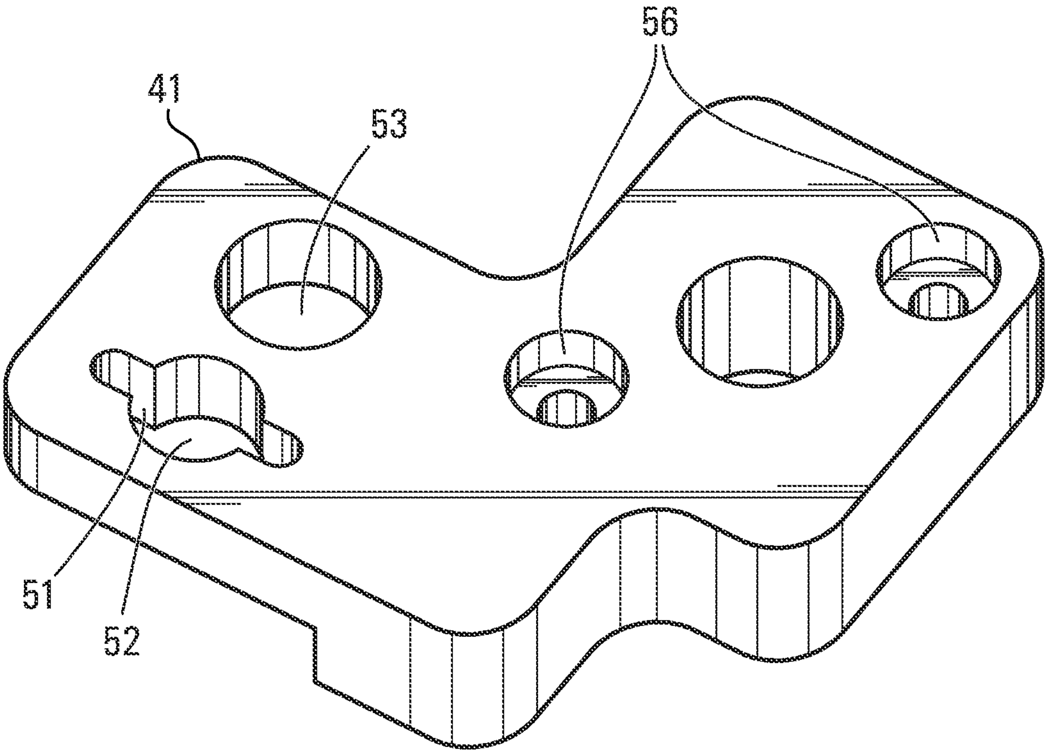
FIG. 5 is a perspective view of a frame block for an AC charging contact mechanism.

The frame block 41 is shown in more detail in FIG. 5. The frame block has a slot center hole 52 through which the turning shaft 42 moves. There is a slot 51 extending from the slot center hole 52. In the illustrated example, slot 51 extends in two directions, in other words the slot has two arms, at a 180° angle. In other embodiments a slot is provided which extends in only one direction. In still other embodiments, a slot is provided that has two arms at any angle. Any number of arms can be used. The turning shaft 35 can be rotated so as to align the stop pin 48 on the turning shaft 42 (see FIGS. 4A, 4B) with the slot 51 in order that the stop pin 48 can go through the slot, or so as to move the stop pin 48 on the turning shaft out of alignment with the slot 51 in order to prevent it from going through. Holes 56 are provided for attaching the frame block 41 to the battery emulator, using for example, screws 36. There is a fitting hole 53 for the sleeve bearing 49.

The stop pin 48 extends radially through the turning shaft 42. In this embodiment, the stop pin 48 extends through the turning shaft 42 so that two ends of the stop pin 48 extend from the turning shaft. In other embodiments, only one end of the stop pin extends from the turning shaft. In other embodiments, two stop pins are used. In some embodiments, more than two stop pins can be used. In still other embodiments, the turning shaft 42 has a protrusion that conforms to a shape of a slot in the frame block 41.

In some embodiments, the stop pin 48 is mounted in a hole on the turning shaft 42 with a press fit and with even exposures on both ends. In some embodiments, in order to avoid interference, the length of the stop pin 48 is selected to be less that the inner diameter of the compression spring 43. The stop pin 48 is shorter than the length of the slot 51 and is longer than a diameter of the slot center hole 52. Thus, the stop pin 48 can go through the slot 51 while the stop pin 48 is oriented parallel to the slot 51 and the stop pin 48 is stopped while it is rotated at a 90 degree angle to the slot 51.

The turning shaft 42 extends through the center of the compression spring 43 with the compression spring being located between a top of the turning shaft 42 and the block 41. The spring biases the turning shaft 42 away from the frame block 41.

The AC charging contact mechanism has two nominal states. In a first state, the stop pin 48 is located on top of frame block 41. The spring 43 biases the turning shaft 42 and correspondingly the bridge PCB 44 and probe 46 away from the position where a mobile phone would be, if present. In a second state, the stop pin 48 is located below the frame block 41, and is rotated with respect to the slot 51 so as to be prevented from passing back through the frame block 41. In turn, the bridge PCB 44 and probe 46 are in a position such that the probe is compressed against an AC charging contact of a mobile phone, if present.

In a very specific example, the spring loaded probe 46 is an SS10 probe available from IDI, and having a tip and a socket with part numbers SS-10-3.8-G and RSS-100-NT respectively.

Before the AC charging contact mechanism 35 is engaged, the mobile device 33 is loaded on the battery emulator 32, and is locked in place using any suitable mechanism, for example by turning a locking wheel. The spring loaded probe 46 is positioned far away enough from the mobile device 33 to avoid scratching the mobile device housing while the mobile device 53 is being loaded.

To engage the AC charging contact mechanism 35, the turning shaft 42 is pushed down while the stop pin 48 is oriented parallel to a slot 51 on the frame block 41. Once the stop pin 48 is completely through the slot 51, the turning shaft 42 is turned, for example by 90 degrees, and then released. The compression spring 43 sits under a knob of the turning shaft and above the frame block 41. The compression spring 43 pushes the turning shaft 42 up while the stop pin 48 holds the turning shaft 42 in place. The position of the turning shaft 43 after engagement is determined by the location of the stop pin 48 on the turning shaft 42. The position of the stop pin 48 is consistent for each engagement.

Figure 6A:
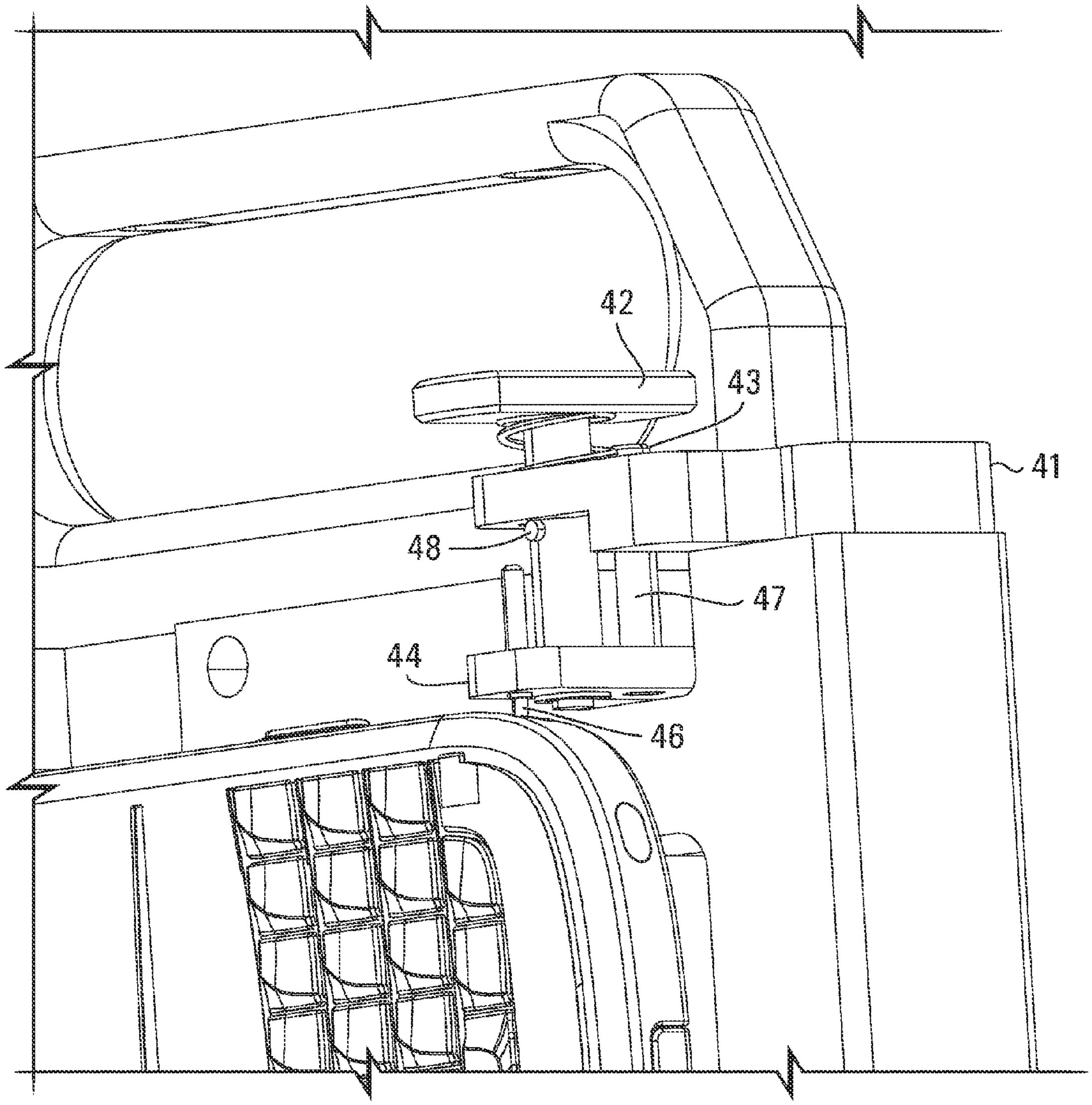
FIG. 6A is a close up view of an AC charging contact mechanism on a battery emulator.
Figure 6B:
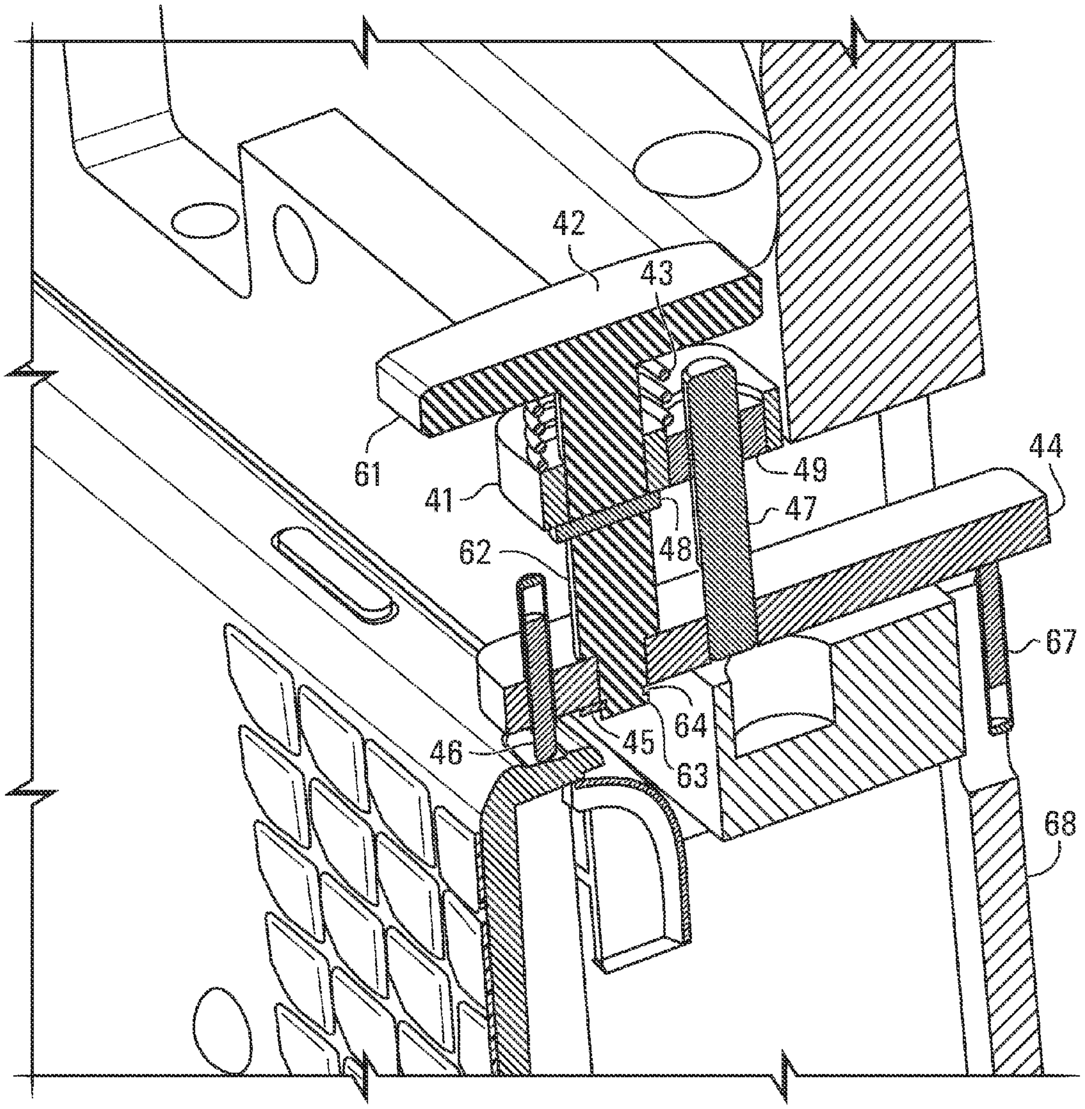
FIG. 6B is a cross-sectional view of the AC charging contact mechanism shown in FIG. 6B.

FIGS. 6A and 6B show a close up view of the AC charging contact mechanism 35 after it is engaged. Referring to FIG. 6B, the turning shaft 42 is shown in cross section to contain features of a knob or handle 61 on a top end, top step shaft 62, and bottom step shaft 63 that has a smaller diameter than the top shaft 62, and a groove 64 defined in the bottom shaft 63. The groove 64 is between the two step shafts 62, 63. The top step shaft 62 of turning shaft 42 has a clearance fit with the slot center hole 52 on the frame block 41, which allows the turning shaft 42 to turn and translate freely. The bridge PCB 44 sits between the shoulder of the top step shaft 62 and a retaining ring 45 positioned in the groove 64.

The guiding pin 47 is mounted in a pairing hole on the bridge PCB 44 by pressure and has a sliding fit with the sleeve bearing 49 in the frame block 41. The guiding pin 47 fits through the pairing hole on the bridge PCB 44 with a sliding fit. Therefore, notwithstanding rotation of the turning shaft 42, the bridge PCB 44 maintains a fixed rotational state with respect to the battery emulator.

As shown in FIGS. 6A and 6B, when the AC charging contact mechanism 35 is engaged, the turning shaft 42 is pushed down and positioned by the stop pin 48. The probe 46 on the bridge PCB 44 is compressed against the AC contact on the mobile device 33. The spring loaded tip of the probe 46 is compressed to some extent and a reliable contact with the AC charge contact can be established. The amount of compression can be changed to fit different requirements under various working conditions by changing the position of the fitting hole 51 for the stop pin 48.

To test the AC charge capability, AC power is provided to the AC charging contacts. There are different ways to route AC power from the fixture main circuit through the battery emulator 32 to the AC charge contacts. One example is depicted in FIG. 6B and is referred to as a probe-bridge PCB-probe solution. Another probe 67 is shown on the bridge PCB 44. The emulator has an emulator PCB 68. When the AC charging contact mechanism is engaged, this probe 67 is compressed against the emulator PCB 68. The emulator PCB 68 is configured to route electric current to the probe 67 when engaged. In turn, bridge PCB 44 has a conductive path (not shown) that routes the current to the probe 46. In another embodiment, a spring is used between bridge PCB 44 and emulator PCB 68 through which electric current is conducted from the emulator PCB 68 to the bridge PCB 44 for delivery to the probe 46.

When implemented as a removable mechanism, the embodiment described with reference to FIGS. 3 to 6B provides an AC charging contact mechanism that is an individual module, which can be easily added to or taken off from a battery emulator (for example, using two screws as illustrated). Such an AC charging contact mechanism can be manufactured separately. An AC charging contact mechanism according to these embodiments is compact and has a relatively simple structure. The design results in a reliable, easy to use and cost effective solution. Furthermore, the AC charging contact mechanism described can be adapted for use for any device under test, such as, but not limited to, mobile phones, PDAs, laptop computers, portable DVD players, portable barcode scanner, and military radios. The AC charging contact mechanism can be used with an appropriately adapted battery emulator for other purposes.

The AC charging contact mechanism of FIGS. 3 to 6B is a specific example of a class of AC charging contact mechanisms that will be referred to herein as pin and spring mechanisms. In such mechanisms, a pin (which can be in the shape of a cylindrical pin as illustrated in the other embodiments, but more generally can have an arbitrary shape) is provided to hold the AC contact charging mechanism in one of two states. In addition, a spring is provided for biasing the AC contact charging mechanism towards the other of the two states. In a specific example of FIGS. 3 to 6B, the pin is pin 48 and holds the AC contact charging mechanism in a state in which the probe 46 is in position to make contact with the AC charging contact of the mobile device. The spring is spring 43 which biases the turning shaft 62 away from the mobile device and in turn biases the AC charging contact mechanism into a state in which the probe 46 does not make contact with the AC charging contact of the mobile device. It should be readily apparent to a person skilled in the art that other pin and spring mechanisms are possible. For example, the position of the pin and spring could be reversed. Probe 46 is a specific example of a conductive element for conducting the AC current between the remainder of the mechanism and the AC charging contact of a mobile device.

Figure 7:
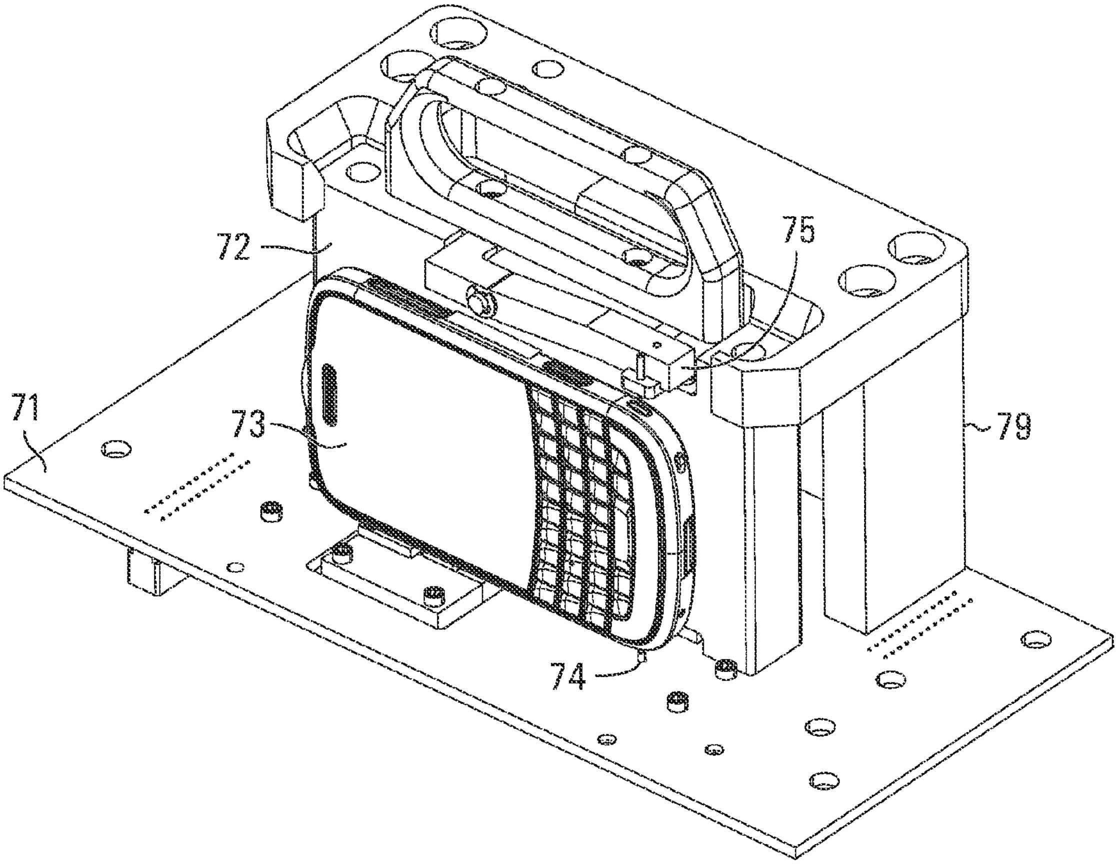
FIG. 7 is a perspective view of a test frame with a battery emulator having an AC charging contact mechanism with a mobile device installed.

An embodiment of an AC charging contact mechanism using a lever will now be described with reference to FIGS. 7 to 10. As shown in FIG. 7, a mobile device 73 under testing is secured on a battery emulator 72, which in turn is secured in the test fixture 79. The power supply and electric signals are routed to the mobile device 73 through an emulator PCB 1001 (shown in FIG. 10) which is located on the back of the battery emulator 72.

The test fixture 79 has a fixture base which includes a platform PCB 71. A probe 74 is soldered to the platform PCB such that it contacts an AC charge contact on the mobile device 73 when installed in the battery emulator 72, which is installed in the test fixture. The battery emulator 72 is removable from the test fixture 79. The battery emulator 72 includes a lever-based AC charging contact mechanism 75, which will be described in more detail below. The description of probe 34 of FIG. 3 applies to probe 74 of FIG. 7.

Figure 8:
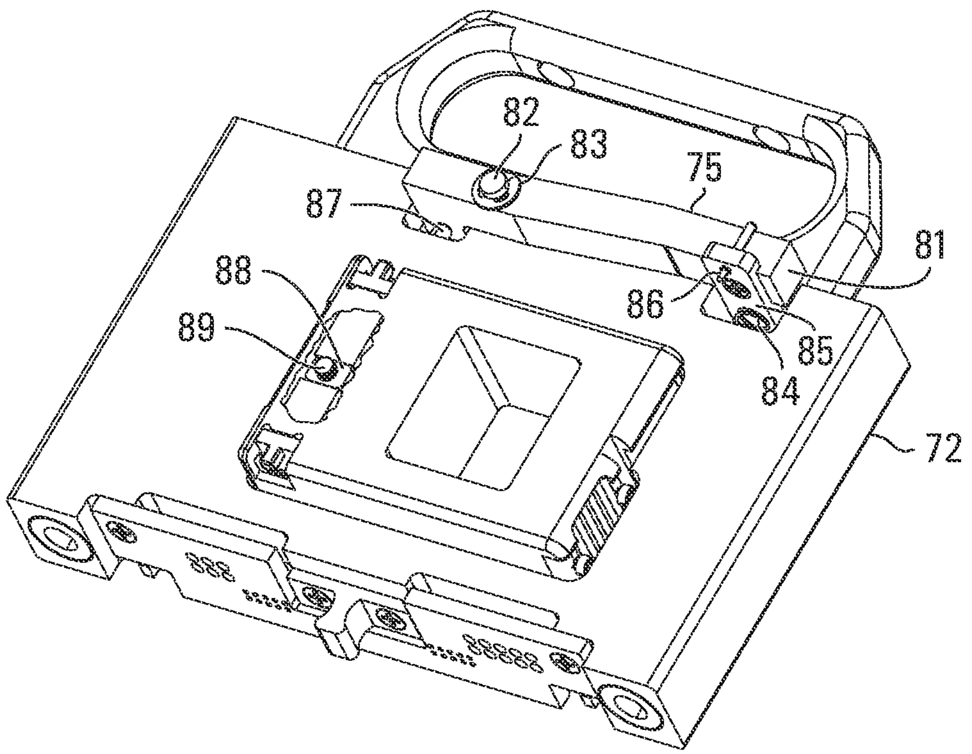
FIG. 8 is a perspective view of a battery emulator having an AC charging contact mechanism.

Referring now to FIG. 8, the components of the lever-based AC charging contact mechanism 75 will be described. In this figure, the battery emulator 72 is shown without the mobile device 73 installed. The lever-based AC charging contact mechanism 75 comprises a lever 81, a clevis pin 82, a retaining ring 83, a compression spring 84, a bridge PCB 85, a probe 86, and a dowel pin 87. The clevis pin 82 which is attached to the battery emulator 72 is held in place on the lever 81 with the retaining ring 83. Attached to an end of the lever 81 opposite the dowel pin 87 is the bridge PCB 85. The probe 86 and the compression spring 84 are attached to the bridge PCB 85. A cam 88 is located on the battery emulator 72 as part of a locking mechanism where the battery compartment of the mobile device would be located when installed. The cam 88 is mounted on a turning shaft 89. The cam 88 is in mechanical engagement with the dowel pin 87 such that when the cam 88 is rotated to a locked state, the dowel pin 87 is moved upwards. Comments made above respecting probe 46 of FIG. 4B apply to probe 86 of FIG. 8.

In operation, a mobile phone is installed in place on the battery emulator 72, and the cam 88 is moved which in turn causes the dowel pin 87 to move, and also locks the mobile phone to the battery emulator 72. The dowel pin 87 contacts one end of the lever 81. In response, the lever 81 pivots (upwards in the view of FIG. 8) about clevis pin 82. Pivoting of the lever 81 in turn causes the opposite end of the lever to move (downwards in the view of FIG. 8) against the force of spring 84. Correspondingly, the bridge PCB attached 85 to the lever 81, and the probe 86 attached to the bridge PCB 85 move towards the location of the AC charging contact of a mobile device when installed, such as mobile device 73 of FIG. 7.

The lever-based AC charging contact mechanism 75 is mounted on the battery emulator 72 to make contact with the AC charging contact on the side of the mobile device 73 opposite the probe 74.

Figure 9:
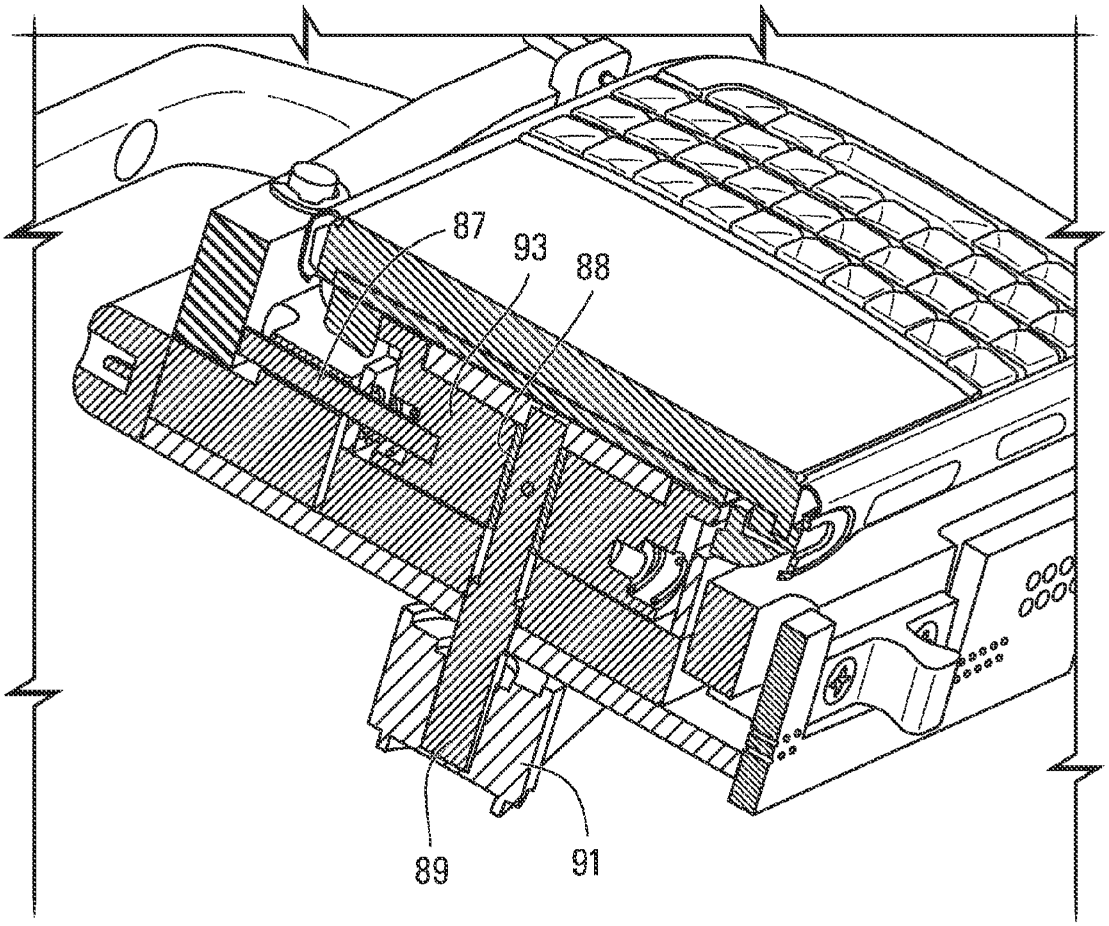
FIG. 9 is a cross-sectional view of the battery emulator shown in FIG. 8.

FIG. 9 is a cross-sectional view showing the locking mechanism of the battery emulator 72. Shown in FIG. 9 is a cam actuator 91, the cam 88, the turning shaft 89, a latch 93 and the dowel pin 87.

In some embodiments, the probe 86 is soldered to the bridge PCB 85 which is in turn secured on one end of the lever 81. The other end of the lever 81 contacts with the dowel pin 87. The dowel pin 87 is driven by the latch 93 of the locking mechanism on the battery emulator 72, which is shown in FIG. 9. When the mobile device 73 is locked by turning the cam actuator 91 on the battery emulator 72, the turning shaft 89 is rotated which in turn rotates the cam 88 mounted on the turning shaft 89. As a result, the cam 88 pushes the latch 93 outward. The dowel pin 87 is pushed outward by the latch 93, which in turn pushes the other end of the lever 81 away from the center of the battery emulator 72 and the mobile device 73. As the pivot point of the lever 81 is in between the two ends, the end of the lever 81 with the bridge PCB 85 is pushed toward the center of the battery emulator 72 and thus toward the mobile device 73, which allows the probe 86 on the bridge PCB 85 to make contact with the AC charging contact on the side of the mobile device 73.

Figure 10:
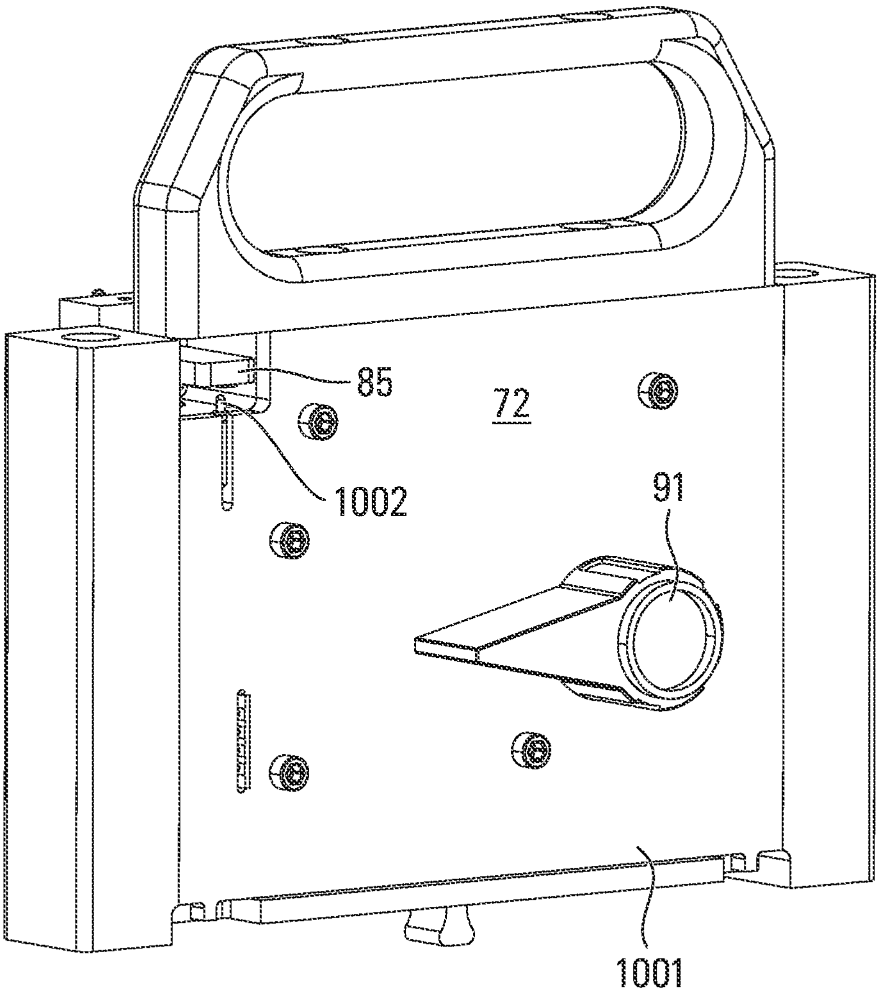
FIG. 10 is a rear view of the battery emulator shown in FIG. 8.

Referring now to FIG. 10 which is a view from the backside of the battery emulator 72. From the back of the emulator 72, emulator PCB 1001 can be seen. Also shown is the cam actuator 91. A probe 1002, such as an SS10 probe as described previously, is soldered to the emulator PCB for delivery of an AC charge current to the bridge PCB. When the cam actuator 91 is rotated so as to make contact between probe 86 and the AC charging contact on the side of the mobile device 73, at the same time bridge PCB 85 moves into contact with probe 1002.

Once the cam actuator 91 is turned reversely, the AC charging contact mechanism 75 is disengaged under the recovering force generated by the compression spring 84.

Figure 11:
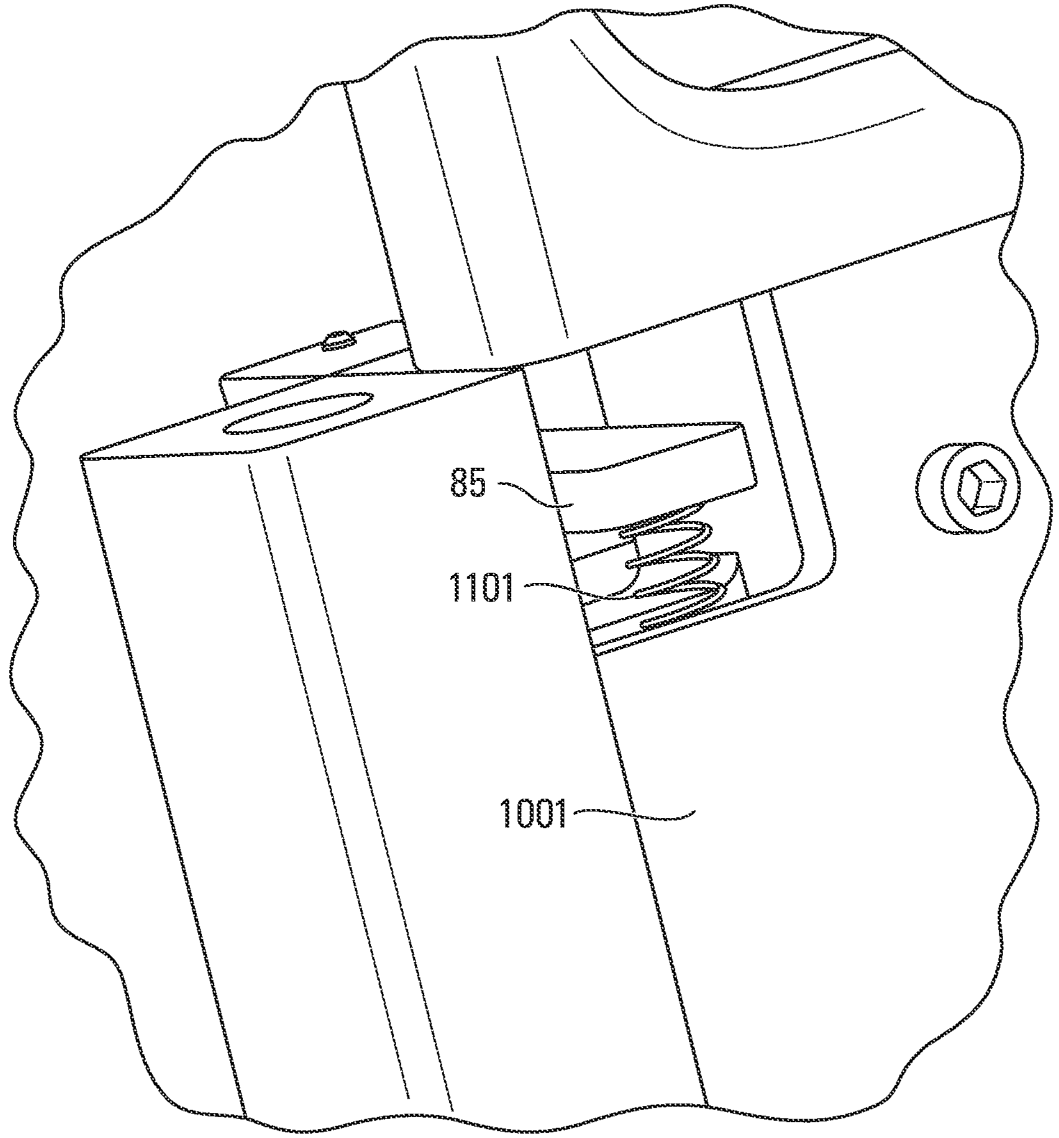
FIG. 11 is a close-up perspective view of an AC charging contact mechanism on a battery emulator.

In another embodiment, shown in FIG. 11, rather than using a probe 1002 to interconnect bridge PCB 85 to emulator PCB 1001, a spring 1101 (for example C0457-036-0158 gold plated, supplied by Trakar) is soldered to the emulator PCB 1001 on one end and the bridge PCB 85 on the other end. In this case, the compression spring 84 can be removed as this spring 1101 can provide the recovering force at the same level.

The embodiment of FIGS. 7 to 11 is a specific example of a class of AC charging contact mechanisms that are referred to herein as lever-based mechanisms. More generally, these mechanisms include a lever that has a pivot point. The lever has a first rotational state above the pivot point and a second rotational state below the pivot point. There is a locking mechanism that secures the mobile device to the battery emulator. The locking mechanism can be as depicted in FIGS. 7 to 11 or some other mechanism. The locking mechanism is in mechanical engagement with the lever so as to move the lever to its first rotational state in response to the locking of the mobile device to the battery emulator. The illustrated embodiment features a spring for biasing the lever to the second rotational state such that when the locking mechanism is unlocked, the spring caused the lever to move to the second rotational state.

In some embodiments, an AC charging contact mechanism per se is provided (be it a spring and pin-based mechanism or a lever-based mechanism, for example), that can be delivered and installed on battery emulators. In another embodiment, a battery emulator with an AC charging contact mechanism installed is provided. In another embodiment, an apparatus that includes a testing fixture, battery emulator and AC charging contact mechanism is provided.

Figure 12:
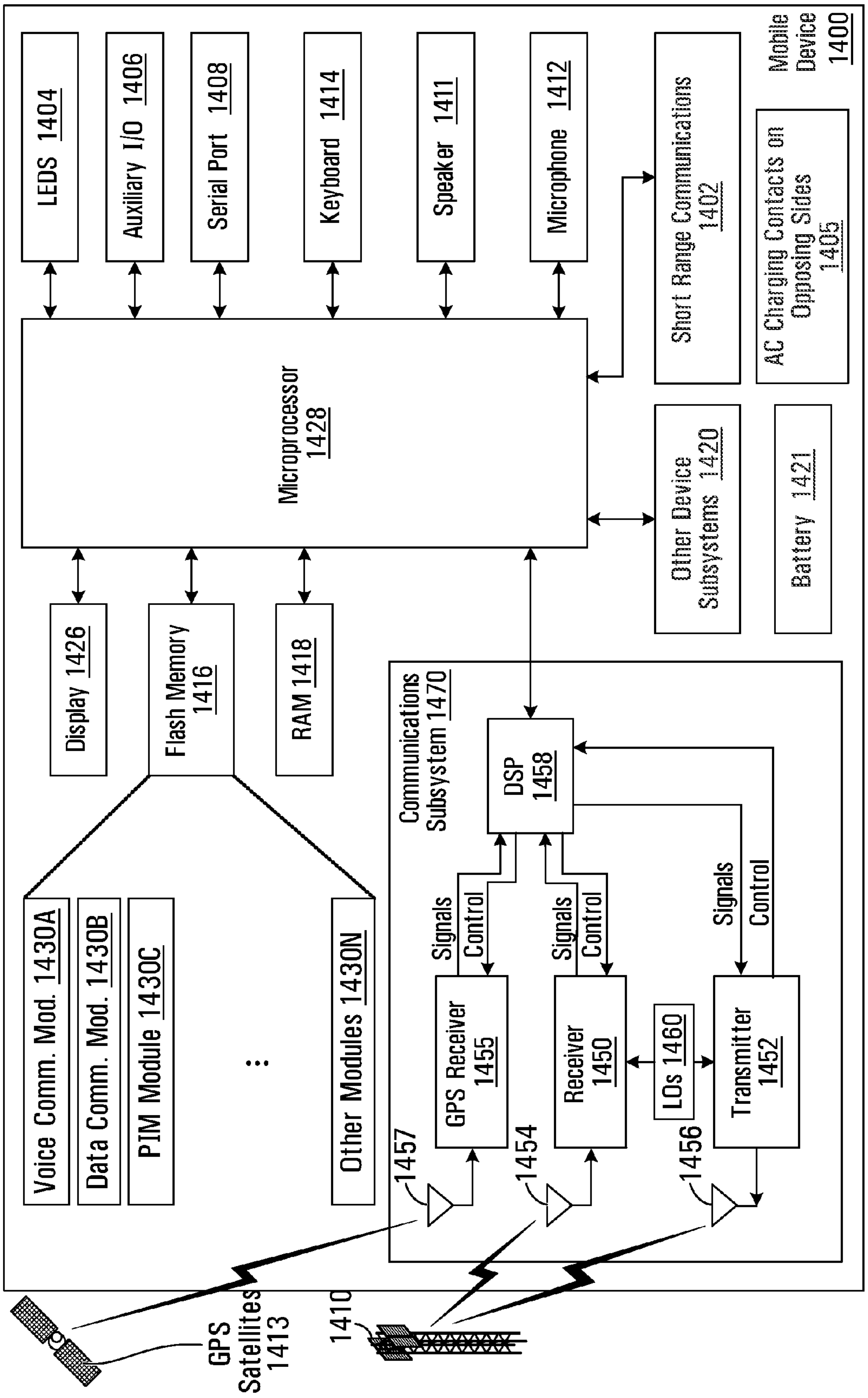
FIG. 12 is a block diagram of a mobile device that may be used with any of the embodiments described herein.

Referring now to FIG. 12, shown is a block diagram of another mobile device 1400 that may be tested in any of the devices or systems described herein. It is to be understood that the mobile device 1400 is shown with very specific details for example purposes only.

The mobile device 1400 has AC charging contacts on opposing sides, generally indicated at 1405, for engagement with the AC charging contact mechanisms of one or more of the embodiments described above.

A processing device (a microprocessor 1428) is shown schematically as coupled between a keyboard 1414 and a display 1426. The microprocessor 1428 controls operation of the display 1426, as well as overall operation of the mobile device 1400, in response to actuation of keys on the keyboard 1414 by a user.

The mobile device 1400 has a housing that may be elongated vertically, or may take on other sizes and shapes (including clamshell housing structures). The keyboard 1414 may include a mode selection key, or other hardware or software for switching between text entry and telephony entry.

In addition to the microprocessor 1428, other parts of the mobile device 1400 are shown schematically. These include: a communications subsystem 1470; a short-range communications subsystem 1402; the keyboard 1414 and the display 1426, along with other input/output devices including a set of LEDS 1404, a set of auxiliary I/O devices 706, a serial port 1408, a speaker 1411 and a microphone 1412; as well as memory devices including a flash memory 1416 and a Random Access Memory (RAM) 1418; and various other device subsystems 1420. The mobile device 1400 may have a battery 1421 to power the active elements of the mobile device 1400. The mobile device 1400 is in some embodiments a two-way radio frequency (RF) communication device having voice and data communication capabilities. In addition, the mobile device 1400 in some embodiments has the capability to communicate with other computer systems via the Internet.

Operating system software executed by the microprocessor 1428 is in some embodiments stored in a persistent store, such as the flash memory 1416, but may be stored in other types of memory devices, such as a read only memory (ROM) or similar storage element. In addition, system software, specific device applications, or parts thereof, may be temporarily loaded into a volatile store, such as the RAM 1418. Communication signals received by the mobile device 1400 may also be stored to the RAM 1418.

The microprocessor 1428, in addition to its operating system functions, enables execution of software applications on the mobile device 1400. A predetermined set of software applications that control basic device operations, such as a voice communications module 1430A and a data communications module 1430B, may be installed on the mobile device 1400 during manufacture. In addition, a personal information manager (PIM) application module 1430C may also be installed on the mobile device 1400 during manufacture. The PIM application is in some embodiments capable of organizing and managing data items, such as e-mail, calendar events, voice mails, appointments, and task items. The PIM application is also in some embodiments capable of sending and receiving data items via a wireless network 1410. In some embodiments, the data items managed by the PIM application are seamlessly integrated, synchronized and updated via the wireless network 1410 with the device user's corresponding data items stored or associated with a host computer system.

As well, additional software modules, illustrated as another software module 1430N, may be installed during manufacture.

Communication functions, including data and voice communications, are performed through the communication subsystem 1470, and possibly through the short-range communications subsystem 1402. The communication subsystem 1470 includes a receiver 1450, a transmitter 1452 and one or more antennas, illustrated as a receive antenna 754 and a transmit antenna 1456. In addition, the communication subsystem 1470 also includes a processing module, such as a digital signal processor (DSP) 1458, and local oscillators (LOs) 1460. The specific design and implementation of the communication subsystem 1470 is dependent upon the communication network in which the mobile device 1400 is intended to operate. For example, the communication subsystem 1470 of the mobile device 1400 may be designed to operate with the MOBITEX™, DATATAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 1400.

Some embodiments also comprise a GPS receiver 1455 with an antenna 1457 for receiving GPS data from one or more GPS satellites 1413.

The GPS receiver 1455 is in communication with the DSP 1458.

Network access requirements vary depending upon the type of communication system. For example, in the MOBITEX™ and DATATAC™ networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, the mobile device 1400 may send and receive communication signals over the communication network 1410. Signals received from the communication network 1410 by the receive antenna 754 are routed to the receiver 1450, which provides for signal amplification, frequency down conversion, filtering, channel selection, etc., and may also provide analog to digital conversion. Analog-to-digital conversion of the received signal allows the DSP 1458 to perform more complex communication functions, such as demodulation and decoding. In a similar manner, signals to be transmitted to the network 1410 are processed (e.g., modulated and encoded) by the DSP 1458 and are then provided to the transmitter 1452 for digital to analog conversion, frequency up conversion, filtering, amplification and transmission to the communication network 1410 (or networks) via the transmit antenna 1456.

In addition to processing communication signals, the DSP 1458 provides for control of the receiver 1450 and the transmitter 1452. For example, gains applied to communication signals in the receiver 1450 and the transmitter 1452 may be adaptively controlled through automatic gain control algorithms implemented in the DSP 1458.

In a data communication mode, a received signal, such as a text message or web page download, is processed by the communication subsystem 1470 and is input to the microprocessor 1428. The received signal is then further processed by the microprocessor 1428 for an output to the display 1426, or alternatively to some other auxiliary I/O devices 1406. A device user may also compose data items, such as e-mail messages, using the keyboard 1414 and/or some other auxiliary I/O device 1406, such as a touchcontact, a rocker switch, a thumb-wheel, or some other type of input device. The composed data items may then be transmitted over the communication network 1410 via the communication subsystem 1470.

In a voice communication mode, overall operation of the device is substantially similar to the data communication mode, except that received signals are output to a speaker 1411, and signals for transmission are generated by a microphone 1412. Alternative voice or audio I/O subsystems, such as a voice message recording subsystem, may also be implemented on the device 1400. In addition, the display 1426 may also be utilized in voice communication mode, for example, to display the identity of a calling party, the duration of a voice call, or other voice call related information.

The short-range communications subsystem 1402 enables communication between the mobile device 1400 and other proximate systems or devices, which need not necessarily be similar devices. For example, the short-range communications subsystem may include an infrared device and associated circuits and components, or a BLUETOOTH™ communication module to provide for communication with similarly-enabled systems and devices.

What has been described is merely illustrative of the application of the principles of methods, modules and devices described herein. Other arrangements and methods can be implemented by those skilled in the art without departing from the spirit and scope of the embodiments.

The invention claimed is:

1. An AC charging contact mechanism for use with a battery emulator, for testing a device under test having first and second AC charging contacts on opposite sides of the device under test, the device under test having a battery compartment, the AC charging contact mechanism comprising:

a first conductive element, the AC charging contact mechanism having a first state in which the first conductive element is positioned to make contact with the first AC charging contact of the device under test having first and second AC charging contacts on opposite sides of the device under test, and the AC charging contact mechanism having a second state in which the first conductive element is positioned away from making contact with the first AC charging contact of the device under test;

a pin and spring mechanism comprising a pin for holding the AC charging contact mechanism in one of the first state and the second state, and a spring for biasing the AC charging contact mechanism towards the other of the first state and the second state.

2. The AC charging contact mechanism of claim 1 wherein the AC charging contact mechanism is removably attachable to the battery emulator.

3. The AC charging contact mechanism of claim 1 wherein:

the spring of the spring and pin mechanism biases the AC charging contact mechanism towards the second state;

the pin of the spring and contact mechanism retains the AC charging contact mechanism in the first state against the biasing force of the spring.

4. The AC charging contact mechanism of claim 1 comprising:

a frame block having a guide slot and a slot center hole, the mechanism further comprising a turning shaft from which the pin of the pin and spring mechanism extends radially, the turning shaft being moveable in a longitudinal direction through the slot center hole while the stop pin is in rotational alignment with the guide slot, the spring of the pin and spring mechanism surrounding the turning shaft, wherein the first conductive element moves in the longitudinal direction together with the turning shaft.

5. The AC charging contact mechanism of claim 4 further comprising:

a printed circuit board connected to an end of the turning shaft to which the first conductive element is connected so as to move in the longitudinal direction together with the turning shaft;

the printed circuit board having a conductive path for connecting the first conductive element to an electric circuit of the battery emulator.

6. The AC charging contact mechanism of claim 5 wherein the printed circuit board is connected to the end of the turning shaft in a manner that allows rotation of the turning shaft with respect to the printed circuit board;

the arrangement further comprising a guiding pin that maintains the printed circuit board in a fixed rotational state notwithstanding rotation of the turning shaft.

7. The AC charging contact mechanism of claim 6 wherein the frame block comprises an opening for receiving the guiding pin and allowing the guiding pin to move in the longitudinal direction through the opening.

8. An AC charging contact mechanism for use with a battery emulator, for testing a device under test having first and second AC charging contacts on opposite sides of the device under test, the device under test having a battery compartment, the AC charging contact mechanism comprising:

the AC charging contact mechanism connected to or integral with the battery emulator, the AC charging contact mechanism having a first conductive element, the AC charging contact mechanism having a first state in which the first conductive element is positioned to make contact with the first AC charging contact of the device under test having first and second AC charging contacts on opposite sides of the device under test, and the AC charging contact mechanism having a second state in which the first conductive element is positioned away from making contact with the first AC charging contact of the device under test;

a lever having a pivot point, the lever having a first rotational state about the pivot point when the AC charging contact mechanism in the first state and having a second rotational state about the pivot point when AC charging contact mechanism is in the second state.

9. The AC charging contact mechanism of claim 8 comprising:

a locking mechanism for securing the mobile device in the battery emulator, the locking mechanism in mechanical engagement with the lever so as to move the lever to the first rotational state in response to locking the mobile device to the battery emulator.

10. The AC charging contact mechanism of claim 9 further comprising:

a spring for biasing the lever to the second rotational state such that when the locking mechanism is unlocked, the spring causes the lever to move to the second rotational state.

11. An apparatus for use in testing a device under test having charging contacts on opposite sides of the device, the device having a battery compartment for receiving a battery, the apparatus comprising:

a battery emulator having a connector for connection to the battery compartment of the device under test having first and second AC charging contacts on opposite sides of the device under test;

an AC charging contact mechanism connected to or integral with the battery emulator, the AC charging contact mechanism having a first conductive element, the AC charging contact mechanism having a first state in which the first conductive element is positioned to make contact with the first AC charging contact of the device under test, and the AC charging contact mechanism having a second state in which the first conductive element is positioned away from making contact with the first AC charging contact of the device under test.

12. The apparatus of claim 11 wherein the AC charging contact mechanism comprises a pin and spring mechanism.

13. The apparatus of claim 12 wherein:

the spring of the spring and pin mechanism biases the AC charging contact mechanism towards the second state;

the pin of the spring and contact mechanism retains the AC charging contact mechanism in the first state against the biasing force of the spring.

14. The apparatus of claim 13 wherein the AC charging contact mechanism further comprises:

a frame block having a guide slot and a slot center hole, the mechanism further comprising a turning shaft from which the pin of the pin and spring mechanism extends radially, the turning shaft being moveable in a longitudinal direction through the slot center hole while the stop pin is in rotational alignment with the guide slot, the spring of the pin and spring mechanism surrounding the turning shaft, wherein the first conductive element moves in the longitudinal direction together with the turning shaft.

15. The apparatus of claim 14 further comprising:

an electric circuit forming part of the battery emulator;

a printed circuit board forming part of the AC charging contact mechanism, the printed circuit board connected to an end of the turning shaft so as to move in the longitudinal direction together with the turning shaft, wherein the first conductive element is connected to the printed circuit board;

the printed circuit board having a conductive path that connects the conductive element to the electric circuit of the battery emulator.

16. The apparatus of claim 15 wherein the printed circuit board is connected to the end of the turning shaft in a manner that allows rotation of the turning shaft with respect to the printed circuit board;

the arrangement further comprising a guiding pin that maintains the printed circuit board in a fixed rotational state with respect to the battery emulator notwithstanding rotation of the turning shaft.

17. The apparatus of claim 11 wherein the AC charging contact mechanism comprises a lever having a pivot point, the lever having a first rotational state about the pivot point when the AC charging contact mechanism in the first state and having a second rotational state about the pivot point when AC charging contact mechanism is in the second state.

18. The apparatus of claim 17 comprising:

a locking mechanism for securing the mobile device in the battery emulator, the locking mechanism in mechanical engagement with the lever so as to move the lever to the first rotational state in response to locking the mobile device to the battery emulator.

19. The apparatus of claim 18 further comprising:

a spring for biasing the lever to the second rotational state such that when the locking mechanism is unlocked, the spring causes the lever to move to the second rotational state.

20. The apparatus claim 11 further comprising:

a test fixture configured to receive and be secured to the battery emulator, the test fixture having a second conductive element positioned to make contact with the second AC charging contact of the device under test;

whereby an AC charging current is deliverable to the device under test through the first and second conductive elements to the first and second charging contacts of the device under test.

21. A method comprising:

installing a device under test in an apparatus for use in testing a device under test having charging contacts on opposite sides of the device, the device having a battery compartment for receiving a battery;

performing device testing with the device under test installed in the apparatus;

wherein the apparatus in which the device under test is installed as part of the method comprises:

a battery emulator having a connector for connection to the battery compartment of the device under test, and an AC charging contact mechanism connected to or integral with the battery emulator, the AC charging contact mechanism having a first conductive element, the AC charging contact mechanism having a first state in which the first conductive element is positioned to make contact with the first AC charging contact of the device under test, and the AC charging contact mechanism having a second state in which the first conductive element is positioned away from making contact with the first AC charging contact of the device under test.

22. The method of claim 21 wherein the AC charging contact mechanism comprises a pin and spring mechanism.

23. The method of claim 21 wherein the AC charging contact mechanism comprises a lever having a pivot point, the lever having a first rotational state about the pivot point when the AC charging contact mechanism in the first state and having a second rotational state about the pivot point when AC charging contact mechanism is in the second state.

* * * * *